No. 772,656. PATENTED OCT. 18, 1904.
H. J. GERNER.
PROCESS OF MAKING ICE CREAM OR THE LIKE.
APPLICATION FILED DEC. 21, 1903.
NO MODEL. 3 SHEETS—SHEET 1.
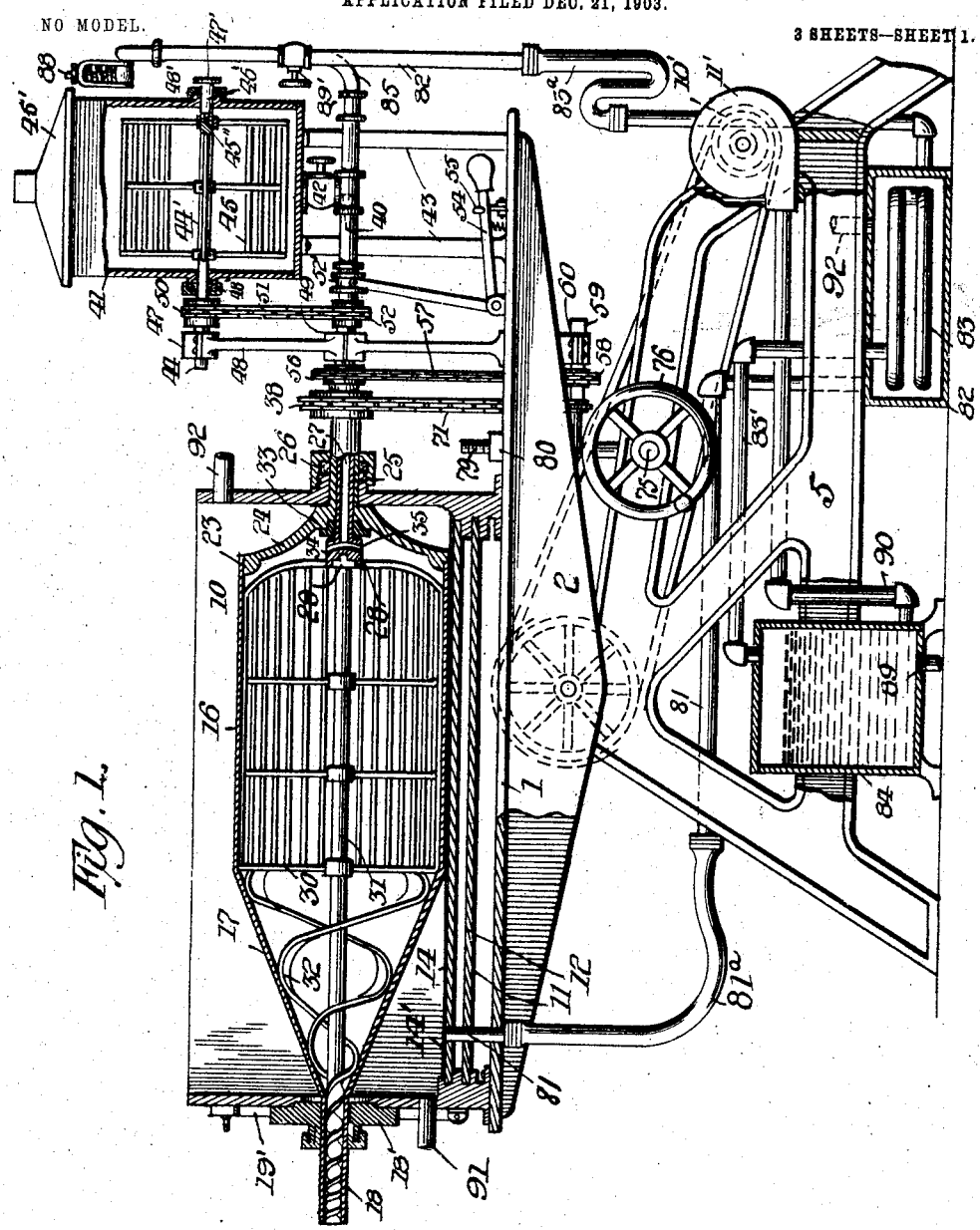
Witnesses:
Inventor
H. J. Gerner,
By
Attorneys

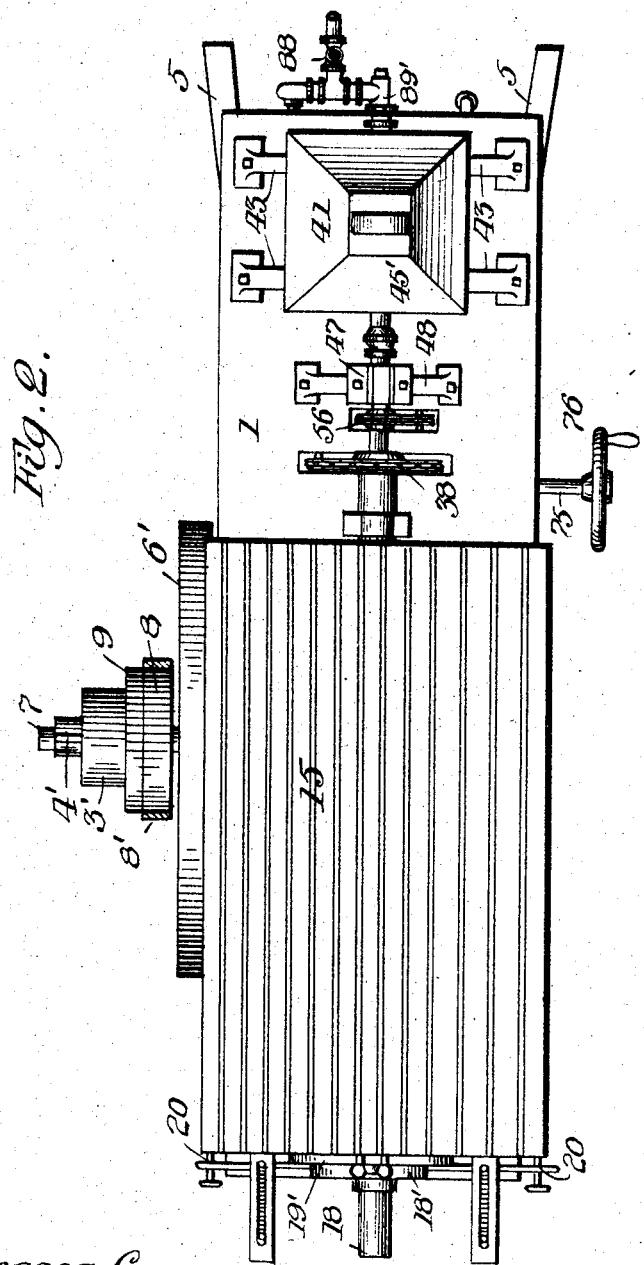

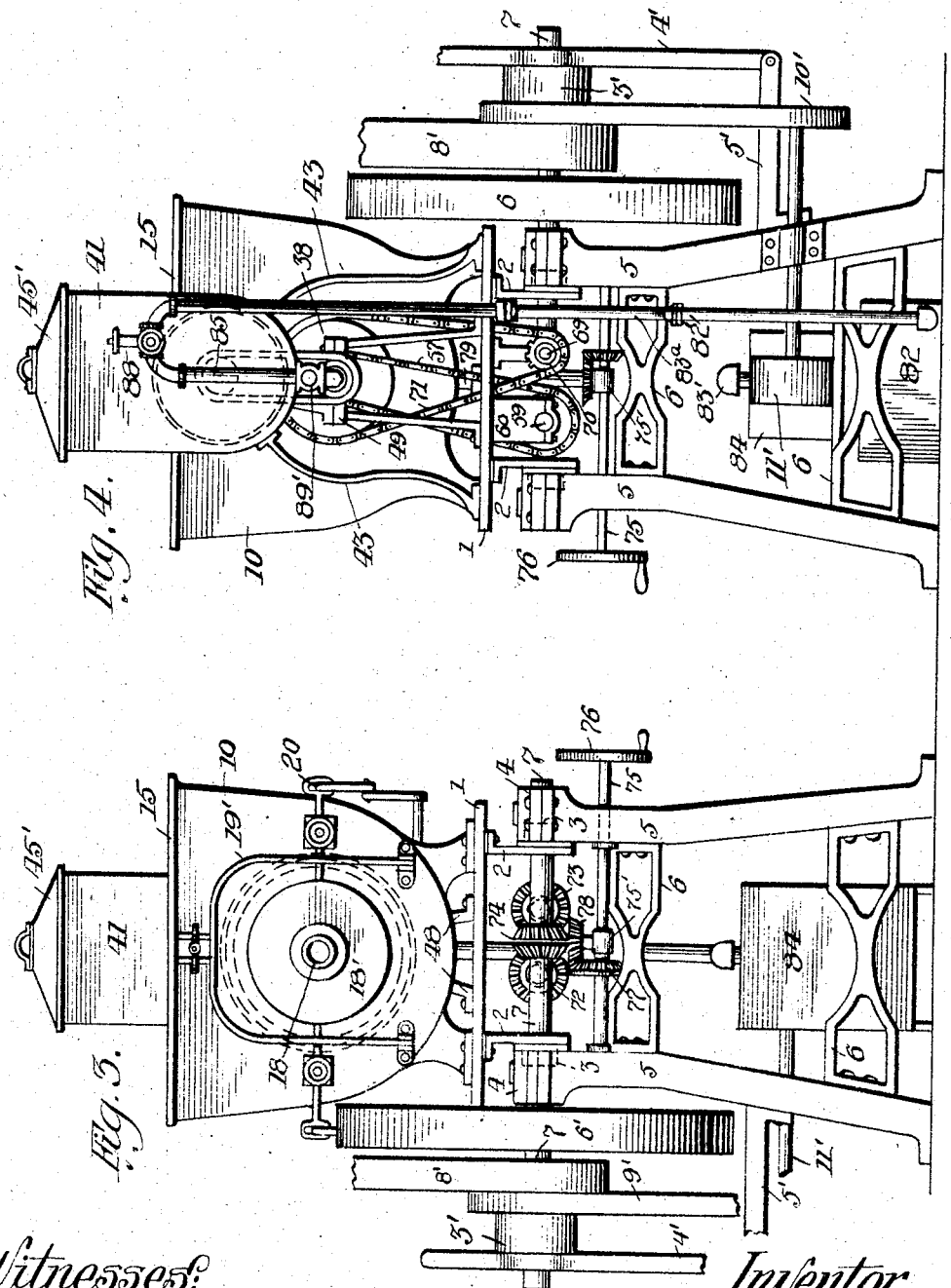

No. 772,656.

Patented October 18, 1904.

UNITED STATES PATENT OFFICE.

HENRY J. GERNER, OF VANDERGRIFT, PENNSYLVANIA.

PROCESS OF MAKING ICE-CREAM OR THE LIKE.

SPECIFICATION forming part of Letters Patent No. 772,656, dated October 18, 1904.

Application filed December 21, 1903. Serial No. 186,019. (No specimens.)

*To all whom it may concern:*

Be it known that I, HENRY J. GERNER, a citizen of the United States of America, residing at Vandergrift, in the county of Westmoreland and State of Pennsylvania, have invented certain new and useful Improvements in Processes of Making Ice-Cream or the Like, of which the following is a specification, reference being had therein to the accompanying drawings.

This invention relates to certain new and useful improvements in refrigerating process, and relates more specifically to the production of frozen creams, ices, and like substances.

The process involved in this application is one such as is carried out by the employment of an apparatus such as shown and described in my Letters Patent No. 749,286, of January 12, 1904; and it consists of a process in which the production of the frozen creams, ices, or the like is continuous during the operation of the apparatus.

Heretofore in the refrigeration of liquids to transform the same into frozen substances—such as creams, ices, and the like—as ordinarily performed the liquid is placed in a tank around which the refrigerating agent is placed and the liquid thoroughly agitated during the refrigerating process. With such a method of manufacture only a certain quantity of the substance can be produced at one time; but in my process I provide a tank or reservoir to contain the liquid to be frozen and feed the liquid from this tank through a hollow dasher-shaft into the freezer-can, providing means whereby the liquid is agitated within the can and whereby it is discharged from the can as it is frozen.

Another important step in my procsss is that of primarily cooling the liquid prior to its discharge into the freezer-can, whereby to materially assist in diminishing the required time to bring the cream or other liquid to the frozen state, as well as imparting to the frozen cream or other liquid a smoother and more agreeable quality.

Still another step in the process is that of filtering the cool air that is discharged into the liquid prior to the depositing of the liquid into the freezer-can and the controlling of the feed and also of the discharge of the liquid.

The apparatus by means of which my process may be carried into effect is herein shown and will be described in detail, like numerals indicating like parts throughout the different views, in which—

Figure 1 is a detail side elevation of the continuous ice-cream freezer, partly in longitudinal section. Fig. 2 is a detail top plan view of the freezer. Fig. 3 is a front elevation thereof. Fig. 4 is a rear elevation of the same.

The apparatus by means of which my improved process is carried into effect contemplates the tilting of the freezer-can, so as to elevate one end thereof above the other end as may be desired to control the discharge of the frozen substance. To accomplish this end, I provide a table 1, carried on brackets 2, which are provided with bosses 3 (see dotted lines, Fig. 3) to engage in the bearings 4, carried by the side frames 5, that support the mechanism. The side frames 5 may be of any suitable form and preferably connected together by cross-braces 6, whereby to give the desired rigidity to the supporting-frame. A drive-shaft 7 is journaled in the bearings 4 and extends through the bosses 3 of the brackets 2 and through the said brackets, the one end of this drive-shaft being extended and having mounted thereon a fly-wheel 6'. A loosely-mounted drive-pulley 8 is connected to a loosely-mounted pulley 9. The drive-pulley 8 receives the drive-belt 8', and pulley 9 receives a belt 9', engaging pulley 10' on the end of the shaft of fan-motor 11', which may be of any desired form of construction and may be mounted on one of the brackets 6 or at any desired point. Carried by one of the side frames 5 is a bracket 5', to which is pivoted the lower end of a lever 4', by means of which the clutch 3' is engaged with and disengaged from the pulley 9. By mounting the drive-pulley and pulley 9 loosely on the drive-shaft it will be observed that I may drive the motor to force air into the freezer-can without operating the drive-shaft, and this enables me to make a test of the can prior to admitting fluid, so as to insure the can being air-tight, and thus obviate all danger of there being a leak in the can, and consequently destroying the cream.

Mounted on the table 1, adjacent one end thereof and over the drive-shaft 7, is a tub or other receptacle 10, which is adapted to receive the freezing agent. This tub or receptacle 10 is preferably of a particular construction, being of a plurality of thicknesses of material, the outer layer 11 being preferably constructed of wood, with a space 12 between said outer layer and the inner lining or layer of wood 14, and on the inner layer of wood 14 is a layer of lining of zinc or other like material 14'. A cover 15 may or may not be hinged to the tub, as may be desired. The freezer-can 16 is mounted horizontally in the tub 10 and is substantially a circular body merging at one end into the conical-shaped portion 17, terminating in the discharge nipple or spout 18. This spout 18 extends through the closure-disk 18', carried by the end of the tub and held closed by a yoke 19', throwing-rods 20 being connected to the closure-disk for the purpose of elevating one end of the can to permit its removal from the tub, as is fully shown and described in the application filed by me relating to improvements for elevating the freezer-can to permit the removal of the dasher from the tub. At its rear or larger end the freezer-can is detachably connected by any suitable means, such as the interlocking half-threads shown in my hereinbefore-mentioned Letters Patent, with the flared head 24, carried by the bearing-sleeve 25. This bearing-sleeve 25 is journaled in the rear end of the tub 10 and passes through a stuffing-box 26, secured to the boss provided therefor on the rear end of the tub. A hollow dasher-shaft 27 extends through the sleeve 25, this shaft being provided in its outer end with a socket 28 to receive the nut 29, carried on the inner end of the shaft which carries the dasher or agitator 30. This dasher or agitator may be of any approved form, the present illustration being that of a construction embodying a central shaft with a series of arms extending radially therefrom, on which the agitating bars or dashers are mounted, the shaft 31 being extended forwardly beyond the dasher proper and through the funnel-shaped portion 17 and the nipple or discharge-sleeve 18 of the freezer-can. Spirally arranged around this extended end of the shaft 31 are the conveyer-screws 32, so mounted as to engage with the inner wall of the cone-shaped portion 17 of the freezer-can and remove the material therefrom, conveying the same through the nipple or discharge-sleeve 18. A packing-gland 33 is inserted in the head 24 around the hollow dasher-shaft 27, and this shaft is provided with a head 34, having transverse openings 35, communicating with the central bore of the shaft and with the freezer-can. The bearing-sleeve 25 receives the hollow dasher-shaft 27 and has mounted thereon the sprocket-wheel 38. Extending into the hollow dasher-shaft 27 is a pipe 40, communicating with the reservoir or cream-tank 41 through the controlling-valve 42. The reservoir or cream-tank 41 is supported by standards 43, which rest upon the table 1, and in one wall of the reservoir or cream-tank is mounted a shaft 44, having a nut on its inner end to engage in the recess provided therefor in the end of the shaft 44', which carries the agitators 45. A suitable lid 45' is provided for this reservoir or cream-tank. One end of the shaft 44 extends some distance beyond the reservoir or cream-tank and is journaled in the bearing 47, carried by the standard 48, supported on the table. This standard also has an intermediate bearing 49, through which the hollow dasher-shaft 27 extends. Mounted on the shaft 44 between the bearing 47 and the reservoir or cream-tank is a sprocket or gear wheel 50, which receives the chain 51, operating over the sprocket or gear wheel 52, mounted on the hollow dasher-shaft 27. The sprocket or gear wheel 52 is loosely mounted on the hollow dasher-shaft, whereby the operation of the agitator in the reservoir or cream-tank may be discontinued, if desired, without ceasing the operation of the dasher in the freezer-can. To accomplish this end, I provide a clutch 52' of ordinary form of construction, controlling the same by means of a spring-pressed lever 54, which is locked to hold the clutch in opened position in a suitable manner, as by a hook 55, carried by the table. Also mounted on the hollow dasher-shaft 27 is a sprocket-wheel 56, which receives the chain 57, passing over said sprocket or gear wheel and over a like sprocket or gear wheel 58, carried on the shaft 59, extending longitudinally of the machine underneath the table. The shaft 44 of the agitator of the reservoir is provided at its opposite end with a threaded socket to receive the threaded end 45'' of the stub bearing-shaft 46', which is journaled in one wall of the reservoir and carries a hand-wheel 47' for operating. The shafts 44 and 46' extend through suitable stuffing-boxes 48'. By this means of construction I am enabled to readily remove the agitator 45 for the purpose of cleansing the same, simply unscrewing the stub-shaft 46' and then shifting the agitator 45 laterally to disengage the nut on the end of the shaft 44 from the recess in the end of the shaft 44', so that the agitator may be lifted out. The shaft 59, above referred to, is journaled in suitable bearings 60, carried by the bed or table. Also journaled in suitable bearings carried by the bed or table is a shaft 69, which carries a sprocket-wheel 70, which receives a chain 71, passing over said wheel and over the wheel 38. The shafts 59 69 carry bevel-pinions 72 73, respectively, which engage with the double-beveled pinion 74, mounted on the drive-shaft 7, whereby a simultaneous movement in reverse directions is imparted to the shafts 59 69. The table is tilted, whereby to incline the freezer-can in order to retain the cream at the rear end of the can in event of the cream freezing slowly or to elevate the rear end of the can and lower the forward end of the same, whereby to more rapidly discharge the frozen cream, by means of a shaft 75, which is journaled in the framework and is provided at one end with a suitable operating-wheel 76, the several pipes leading to the apparatus on the table being provided with flexible sections at appropriate points. This shaft 75 carries a beveled pinion 77, which meshes with the beveled pinion 78, carried on the vertical screw 79, swiveled in a collar 75', loosely arranged on the shaft 75. The shaft 75 is free to be rotated at will. The screw 79 passes through the cross-head 80, mounted on top of the table or bed 1 and rigidly secured thereto.

Communicating with the tub 10, through the bottom thereof, at a suitable point is one end of a drain-pipe 81, the other end of which terminates in and communicates with the tank 82, which may be located on the floor underneath the machine. Interposed in this pipe 81 is a flexible section 81ª, as heretofore referred to, in order to permit the tilting of the table. Arranged in this tank 82 is a coiled pipe 83, one end of which extends out through the top of the tank and communicates with the top of the filter 84, the other end of the coiled pipe extending out through one end of the tank 82 and being carried upwardly at the rear of the machine and given a return-bend 85 and communicating with the end of the pipe 40. The branch 82' of the pipe which extends upwardly at the rear of the machine is extended to a height equal to the top of the reservoir or cream-tank before being given the return-bend. This is done whereby to prevent any backflow of the cream from the tank into the air-pipe, and at the upper end of the pipe I provide the same with a suitable blow-off valve 88, whereby any excess pressure over the above pressure to which the blow-off valve 88 is set will be discharged to the atmosphere and an even pressure of the air in the hollow dasher maintained. The quantity of air fed is regulated by a valve 89' in the branch 82' of the air-pipe. The filter 84 may be provided with a suitable drain 89, a pipe 90 connecting the filter with the fan 11'. The branch 82' has one of the flexible sections heretofore referred to and, as shown at 83ª, Fig. 1, interposed therein in order to permit the tilting of the table.

With the apparatus described I may use either ice or brine as a freezing agent, and when using ice the salt water is led off from the tub 10 through the pipe 81 to the air-cooling tank 82, that may be located under the machine or at any desired point, and from which tank the water may be drained off to any desired point. If, however, brine is being used as the refrigerating agent, the brine is pumped into the tub 10 from the brine-tank (not shown) through pipe 91 and overflows through pipe 92 into the air-cooling tank 82 to cool the air circulating through coil 83, and from the tank 82 the brine is pumped back to the brine-tank. When brine is employed as a freezing agent, it is desirable to introduce the same into the tub 10 at the forward end thereof, for the reason that the cream which has been frozen is at this forward end of the tub, (the frozen cream being of a lower temperature than the unfrozen cream,) and consequently the two lower temperatures (that of the frozen cream and that of the brine on entering the tub) meet at this point, while the two higher temperatures (that of the unfrozen cream and the brine after circulation in the tub) are at the opposite end of the tub. This is a desirable feature when using brine as the freezing agent, as the lowest temperature is desired at the point where the cream is in the frozen state or condition, and it has been found undesirable to cause the cream to freeze too rapidly upon its entry into the freezer-can.

In operation the cream or other liquid is placed in the reservoir or cream-tank 41, and the flow of the same into the pipe 40 is regulated by means of the controlling cock or valve 42. Any suitable form of drive power may be employed, the drive-belt 8' engaging drive-pulley 8, whereby to rotate the drive-shaft 7 and through the medium of the double pinion 74 and pinions 72 73 impart an opposite rotary movement to the shafts 59 69 and through the rotation of these shafts impart an opposite rotation to the hollow dasher 27 and the freezer-can 16 through the medium of the connecting-chains 57 71. The rotating of the hollow dasher-shaft imparts movement to the agitator or dasher in the cream-tank through the medium of a drive-chain 51. The turning of drive-shaft 7 causes pulley 9 and belt 9' to operate the fan or motor 11', discharging the air into the water-filtering tank 84, so that this air will be filtered as it passes through the water and will pass into branch 83' of the air-pipe 83 in a pure state, and as the air circulates through the coiled pipe 83 in the cooling-tank 82 it is thoroughly cooled before being discharged through the branch 82' and return-bend 85 into pipe 40 and into contact with the cream or other liquid, the blast of cooled air carrying the liquid herewith through the hollow dasher-shaft and discharging it through transverse ports 35 into the freezer-can. As the cream or other liquid is forced into the freezer-can by the action of the blast of air, which air has been filtered and then cooled or reduced to a very low temperature by its passage through the cooled portion 83 of the pipe 82' in cooling-tank 82, the cream or other liquid is discharged into the freezer-can at a comparatively low temperature, thereby aiding materially in the rapidity with which the cream is frozen in the can. As the cream is frozen and becomes stiff it has been worked to the conical end of the freezer-can by the action of the dasher and is engaged by the conveyer 32 and conducted by said conveyer through nipple or discharge-tube 18, where it is received in any suitable vessel provided therefor. When it is observed that the cream is freezing slowly and it is desired to retain the same in the freezer-can until it has been frozen to a greater extent, the tilting device heretofore described is operated, whereby to lower the rear end of the freezer-can and thereby hold or retain the cream in the rear end of said can and subject the same to the influence of the freezing agent for a greater length of time, and where the cream is observed to be freezing rapidly the tilting device is operated, whereby to elevate the rear end of the can and lower the forward end thereof in order that the conveyer will more rapidly discharge the frozen cream or other substance from the can. If at any time during the operation of the machine it is observed that the cream in the reservoir or cream-tank has been agitated to a sufficient extent, the clutch 52' is disengaged, whereby the operation of the agitator or dasher in the reservoir or cream-tank is discontinued without discontinuing the operation of the machine. As the supply of cream or other liquid in the reservoir or cream-tank is replenished the clutch 52' may again be thrown into operation, whereby to operate the agitator in the reservoir or cream-tank simultaneously with the operation of the dasher in the freezer-can. By the agitating of the cream or other liquid in the reservoir or tank considerable life is imparted thereto and is maintained by the forcing of the cream into the can under the action of the cooled air, which serves to create a spray or foam that is furthered by the egress of the cream through the hollow dasher-shaft and the discharge of the cream through the transverse ports 35 against the rapidly-revolving freezer-can or dasher. In practice I have demonstrated that by this method I am enabled to produce a cream of superior quality, possessing the properties of being extremely light and highly tasteful. By the arrangement of the fly-wheel 6' and the pulleys 8 9 and drive-belt 8' all at one side of the machine, which is on the reverse side to that at which the operator stands for attending the machine, all danger of injury to the operator is eliminated.

The agitator in the cream tank or reservoir is particularly valuable in the freezing of "fruit-creams" or the like, as the mixture in the tank will be kept thoroughly mixed and agitated, so as to feed properly to the freezer-can.

The amount of air fed to the liquid may be controlled by the valve 89', and if at any time it is desired to shut off the air entirely and allow the cream to feed solely by gravity to the freezer-can the fan may be allowed to exhaust to the atmosphere.

While I have herein shown and described my invention in detail, it will be observed that various slight changes may be made in the details of construction without departing from the general sprit of my invention.

Having fully described my invention, what I claim as new, and desire to secure by Letters Patent, is—

1. The herein-described process for refrigerating liquids which consists in artificially cooling a stream of air, impelling a liquid into a receptacle by means of said cooled air and subjecting this liquid to refrigeration in such receptacle.

2. The herein-described process of aeration and refrigeration which consists in artificially cooling air and filtering the same, imparting motion to the air, impelling a liquid by means of the air into a receptacle and subjecting it to refrigeration therein.

3. The herein-described process for refrigerating liquid consisting in agitating the liquid, then impelling it by means of an air-blast into a receptacle, then refrigerating it in the receptacle.

4. The process of refrigerating liquids consisting in subjecting the liquid to a preparatory cooling, meanwhile agitating the same, cooling a stream of air, feeding the liquid into contact with the stream of air and causing the liquid and air to commingle, subjecting the liquid and air to a frigorific temperature and then leading off the refrigerated liquid.

In testimony whereof I affix my signature in the presence of two witnesses.

HENRY J. GERNER.

Witnesses:
A. M. WILSON,
E. E. POTTER.